(12) United States Patent
Kalenahalli et al.

(10) Patent No.: US 11,082,930 B2
(45) Date of Patent: Aug. 3, 2021

(54) METHOD AND SYSTEM FOR EFFICIENTLY DETERMINING POWER ALLOCATION OF RADIOS UTILIZING SHARED SPECTRUM

(71) Applicant: CommScope Technologies LLC, Hickory, NC (US)

(72) Inventors: Suryanarayana A. Kalenahalli, Chantilly, VA (US); Ariful Hannan, Sterling, VA (US); Mayowa Aregbesola, Herndon, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/597,605

(22) Filed: Oct. 9, 2019

(65) Prior Publication Data

US 2020/0120615 A1 Apr. 16, 2020

Related U.S. Application Data

(60) Provisional application No. 62/746,315, filed on Oct. 16, 2018.

(51) Int. Cl.
*H04W 52/24* (2009.01)
*H04W 72/08* (2009.01)
(Continued)

(52) U.S. Cl.
CPC ........ *H04W 52/243* (2013.01); *H04B 17/327* (2015.01); *H04B 17/373* (2015.01);
(Continued)

(58) Field of Classification Search
CPC ... H04W 52/243; H04W 16/10; H04W 16/14; H04W 52/367; H04W 64/003;
(Continued)

(56) References Cited

U.S. PATENT DOCUMENTS

| 9,271,311 B1* | 2/2016 | Gurney | H04W 76/50 |
|---|---|---|---|
| 2017/0195887 A1* | 7/2017 | Jovancevic | H04W 72/0446 |
| 2020/0162929 A1* | 5/2020 | Cimpu | H04W 52/367 |

FOREIGN PATENT DOCUMENTS

| WO | 2016033049 A1 | 3/2016 |
|---|---|---|
| WO | WO2016033049 | * 3/2016 |
| WO | 2017139206 A1 | 8/2017 |
| WO | 2019055133 A1 | 3/2019 |

OTHER PUBLICATIONS

VAKA, Pradeep Reddy, Security and Performance Issues in Spectrum Sharing between Disparate Wireless Networks:, Masters of Science in Electrical Engineering, May 5, 2017, Virginia Polytechnic Institute and State University, pp. 1-82 (Year: 2017).*
(Continued)

*Primary Examiner* — Yuwen Pan
*Assistant Examiner* — Angelica M Perez
(74) *Attorney, Agent, or Firm* — Fogg & Powers LLC

(57) ABSTRACT

Techniques are provided for efficiently determining power allocation of radios utilizing shared spectrum by enhancing processing efficiency for determining aggregate interference levels in a region of points where aggregate interference must not exceed a threshold level. Processing efficiency is achieved by techniques identifying a subset of points in the region at which analysis must be performed.

20 Claims, 8 Drawing Sheets

(51) Int. Cl.
  *H04W 72/04* (2009.01)
  *H04B 17/391* (2015.01)
  *H04W 16/10* (2009.01)
  *H04B 17/327* (2015.01)
  *H04W 16/14* (2009.01)
  *H04W 64/00* (2009.01)
  *H04W 52/36* (2009.01)
  *H04B 17/373* (2015.01)

(52) U.S. Cl.
  CPC ........ *H04B 17/3913* (2015.01); *H04W 16/10* (2013.01); *H04W 16/14* (2013.01); *H04W 52/367* (2013.01); *H04W 64/003* (2013.01); *H04W 64/006* (2013.01); *H04W 72/0473* (2013.01); *H04W 72/082* (2013.01); *H04W 72/085* (2013.01)

(58) Field of Classification Search
  CPC ........... H04W 64/006; H04W 72/0473; H04W 72/082; H04W 72/085; H04B 17/327; H04B 17/373; H04B 17/3913
  See application file for complete search history.

(56) References Cited

OTHER PUBLICATIONS

International Searching Authority, "International Search Report and Written Opinion from PCT Application No. PCT/US2018/043511 dated Nov. 7, 2018", pp. 114, Published: WO.

Sohul et al., "Spectrum Access System for the Citizen Broadband Radio Service", 5G Spectrum: Enabling the Future Mobile Landscape, Jul. 2015, pp. 1825, IEEE Communications Magazine.

Vaka et al., "Security and Performance Issues in Spectrum Sharing between Disparate Wireless Networks", Thesis submitted in partial fulfillment of the requirements for the degree of Masters of Science in Electrical Engineering, May 5, 2017, pp. 182, Virginia Polytechnic Institute and State University.

Wikipedia, "Free-space path loss", at least as early as Aug. 6, 2018, pp. 15, Wikipedia.

Wireless Innovation Forum, "Requirements for Commercial Operation in the U.S. 3550-3700 MHz Citizens Broadband Radio Service Band", Working Document WINNF-TS-0112, Jan. 16, 2018, pp. 1-77, The Software Defined Forum Inc.

* cited by examiner

METHOD AND SYSTEM FOR EFFICIENTLY DETERMINING POWER ALLOCATION OF RADIOS UTILIZING SHARED SPECTRUM

CROSS-REFERENCE TO RELATED APPLICATIONS

The present application claims benefit of U.S. patent application Ser. No. 62/746,315, filed Oct. 16, 2018; the entire contents of the aforementioned patent application are incorporated herein by reference as if set forth in its entirety.

BACKGROUND

Shared spectrum usage by governmental and commercial users has been proposed, e.g. for Citizens Broadband Radio Service (CBRS) specified by the United States Federal Communications Commission (FCC). With shared spectrum usage, a multitude of wireless service providers may utilize such spectrum. Each service provider would employ a system of citizens broadband radio service device(s) (CBSD(s)), such as base station(s), e.g. that would facilitate communications with user equipment (or end user devices (EUDs)). The system's CBSDs would be coupled to other networks, such as the Internet, e.g. by a core network.

The CBSDs are part of a spectrum access system ("SAS"). A SAS controller, of a SAS, regulates, e.g. the number and transmit power emissions of CBSDs that operate in the frequency spectra in a neighborhood around each protection point. A CBSD must request permission from the SAS controller prior to transmitting in frequency spectra controlled by the SAS controller. Optionally, the CBSD also requests that the SAS controller permit the requesting CBSD to transmit at a specified power level.

The SAS controller determines whether to allow the requesting CBSD to transmit in the frequency spectra, and allocates using, e.g. an iterative allocation process (IAP), transmit power levels to all CBSDs authorized by the SAS controller to transmit in the frequency spectra. The SAS controller is configured to regulate a maximum transmission power of CBSDs such that the aggregate interference at an incumbent caused by CBSDs' transmissions is below a predetermined interference threshold.

The IAP is a process that helps achieve this goal by setting an upper bound of transmit power of CBSDs when each individual CBSD is allocated an equal portion of an incumbent's interference threshold. When the incumbent is a GWPZ or PAL, determination of such upper bounds of transmit power for each CBSD can be time consuming given the sheer volume of CBSD-protection point pairs that need to be processed.

WInnForum SAS general requirement (requirement) R2-SGN-16 of WINNF-TS-0112 defines the IAP. The IAP regulates interference by setting an upper bound of transmit power for each CBSDs by allocating each CBSD an equal portion of an incumbent's interference threshold. The IAP determines such transmit power levels by allocating interference margin equally to CBSDs in neighborhood(s) of protection point(s) proximate to the CBSDs. The IAP determines such transmit power levels by allocating interference margin equally to CBSDs in neighborhoods of protection points of one or more of each of a fixed satellite service (FSS), priority access license (PAL) protection area (PPA), grandfathered wireless protection zone (GWPZ), and an environmental sensing capability (ESC) system. Protection points are points where aggregate interference must not exceed a threshold levels to diminish interference to receivers of certain, e.g. higher priority, users. The foregoing systems are fixed in location and deemed to be receiving all the time at their fixed location.

PPAs and GWPZs have more than one protection point which can exponentially increase analysis time. When the incumbent is a GWPZ or a PAL PPA, determination of such upper bounds of transmit power for each CBSD can be time consuming given a sheer volume of CBSD protection point pairs that need to be processed.

Further, R2-SGN-04 of WINNF-TS0112 specifies that more than one propagation loss model need be used when determining path loss for PPAs and GWPZs for IAP calculation. For example, if the distance of a CBSD is greater than or equal to 1 km and less than or equal to 80 km, the IAP must calculate path loss using both the irregular terrain model ("ITM") and the extended Hata ("eHata") model. Compared to the ITM, the eHata propagation model provides more accurate modelling over short distances, e.g. 2 km or less particularly in urban environments. ITM provides more accurate modelling over longer distances particularly in rural environments. The ITM and eHata propagation model are processing intensive as each requires obtaining elevation data for end point locations; obtaining such elevation data significantly delays TAP analysis.

SUMMARY OF THE INVENTION

A program product for diminishing the number of points used to allocate interference margin to radios is provided. The program product comprises a non-transitory processor readable medium on which program instructions are embodied, wherein the program instructions are configured, when executed by at least one programmable processor, to cause the at least one programmable processor to: determine that an average land category for a region is not a certain land category type, where the region comprises points; upon determining that the average land category for the region is not the certain land category type, then: generate a discovery area around the region; determine a maximum elevation of all radios in the discovery area; determine a minimum elevation of all points in the region; determine that the maximum elevation less the minimum elevation is less than or equal to a differential altitude; and upon determining that the maximum elevation less the minimum elevation is not less than or equal to the differential altitude, then determine a subset of points in the discovery area at which aggregate interference from radios in the discovery area analyzed, where aggregate interference for each point is determined with a propagation model of a set of at least one propagation model to determine a maximum transmission power of the radios in the discovery area, and where the radios in the discovery area are configured to transmit at a power level equal to or less than the determined maximum power level.

DRAWINGS

Figure 4A:
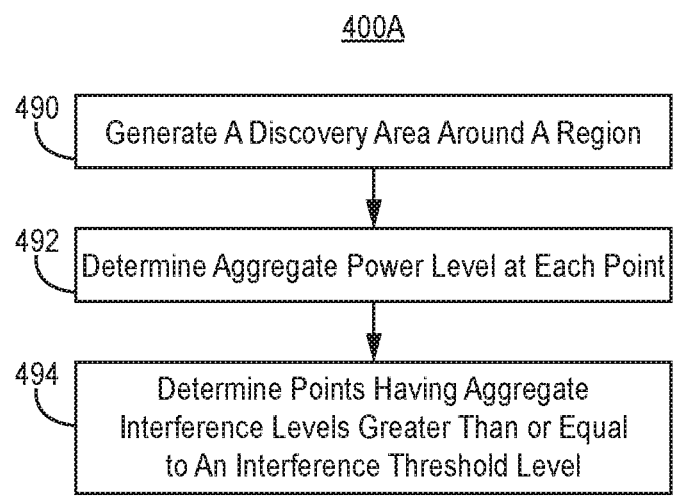
Figure 4B:
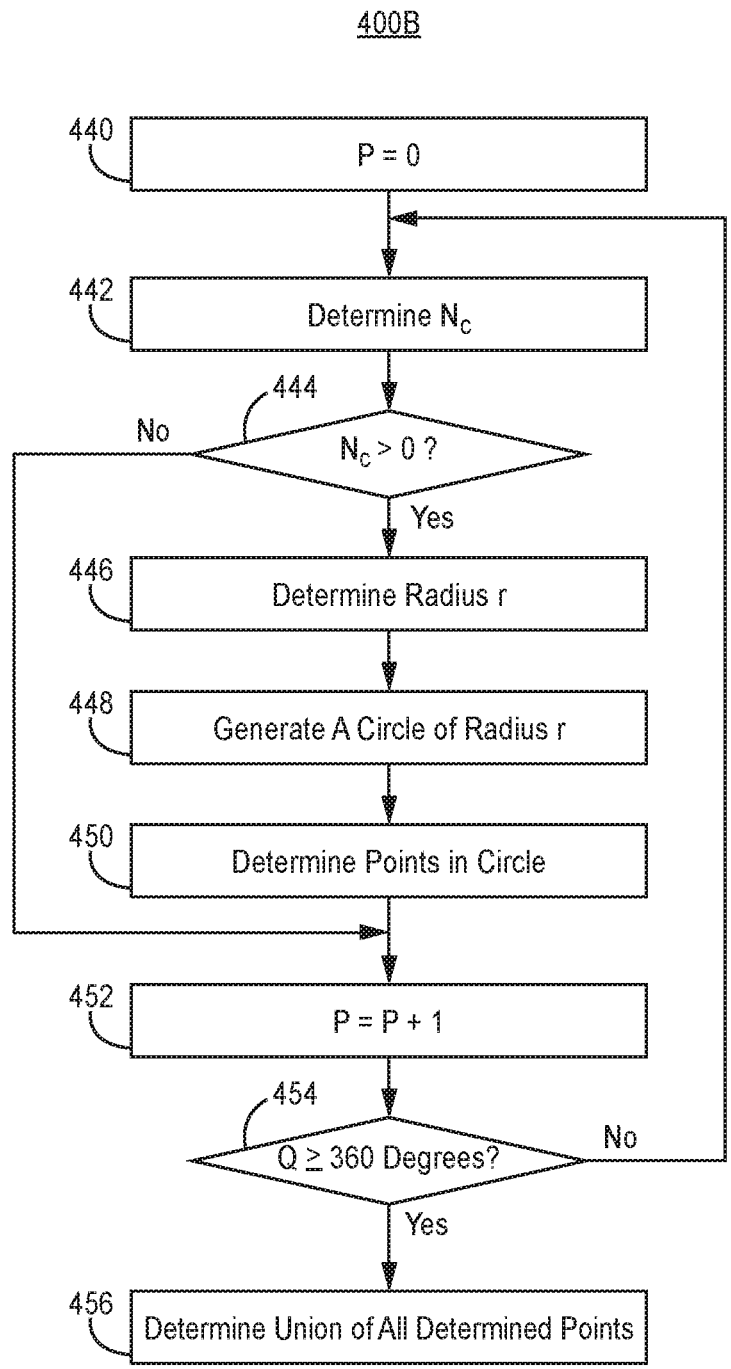
Figure 4C:
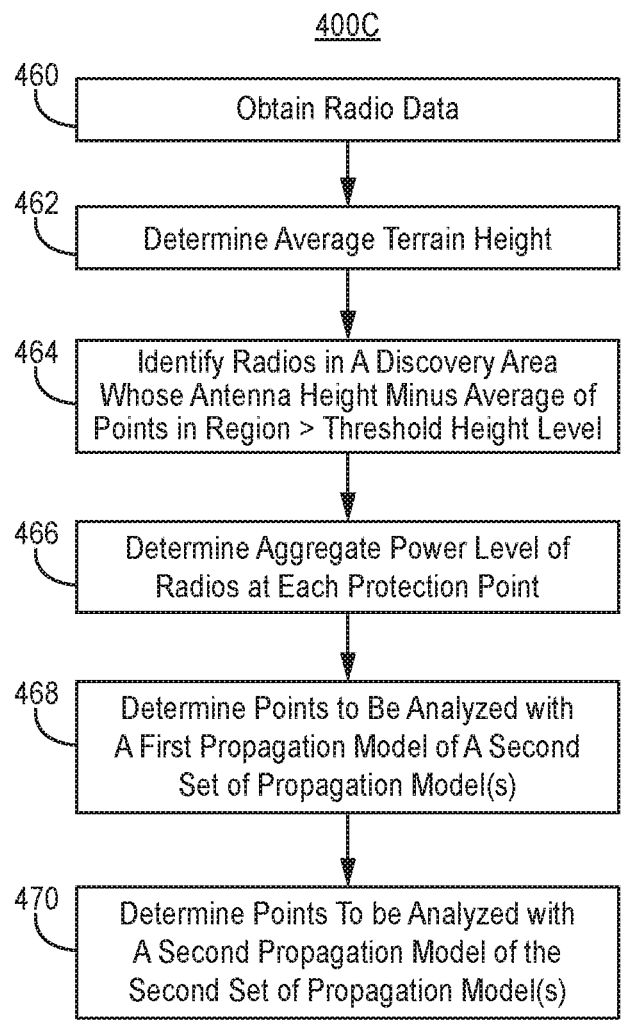
Figure 5:
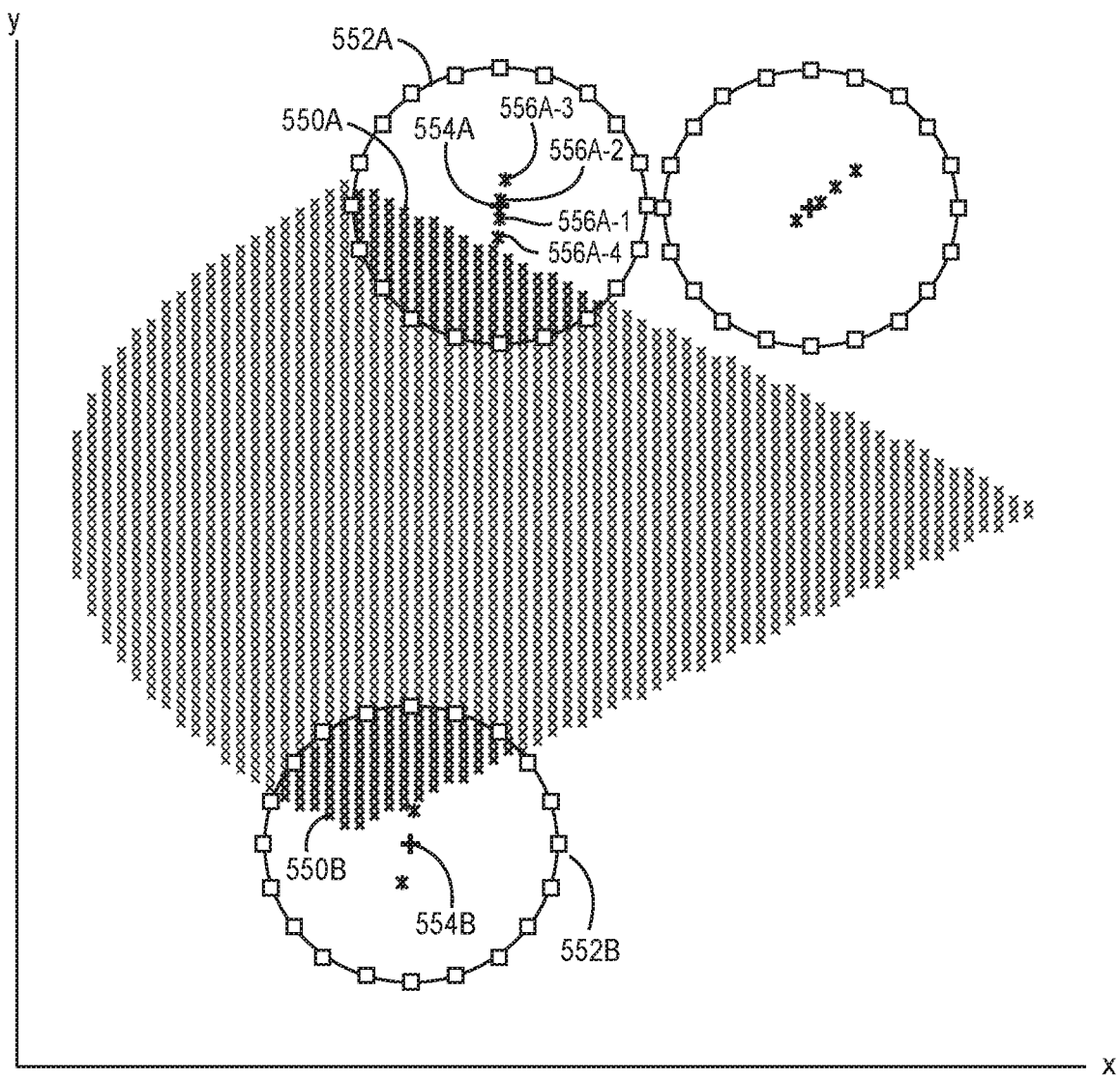

FIG. 4A one embodiment of identifying points to be analyzed to determine a maximum power level of each radio in a discovery area using a set of propagation model(s);

FIG. 4B illustrates one embodiment of a determining protection points to be analyzed with another set of propagation model(s);

FIG. 4C illustrates one embodiment of a determining protection points to be analyzed with yet another set of propagation model(s); and FIG. 5 illustrates one embodiment of a diagram illustrating points within circles that must be considered for power allocation processing using the second set of propagation model(s).

DETAILED DESCRIPTION

In the following detailed description, reference is made to the accompanying drawings that form a part hereof, and in which is shown by way of illustration specific illustrative embodiments. However, it is to be understood that other embodiments may be utilized, and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

To more efficiently allocate interference margin to CBSDs, it is desirable to reduce the number of points of a region of protection points at which propagation model calculations are performed. This diminishes the amount of elevation data to be obtained. The reduced number of points may be referred to herein as a subset of points of the region (or a subset of points).

To do so, the embodiments of the invention determine the subset of points based upon an average land category for the region, and utilize an appropriate propagation model, based at least in part on the land category. If the average land category is not a certain land category type, e.g. rural, then a difference between the maximum and minimum elevations in a discovery area is compared to a threshold altitude. If the difference is less than or equal to the threshold, then a subset of points is determined which are analyzed—to determine maximum power levels of radios—with a first set of at least one propagation model (a first set of propagation model(s)); each propagation model of the first set corresponds to a unique subset of the subset of points of the subset of points. If, for example, the first set consists of the eHata propagation model, then aggregate interference at the subset of points is analyzed with the eHata propagation model.

If the difference is not less than or equal to the threshold altitude, then a subset of points is determined which are analyzed—to determine maximum power levels of radios—with a second set of at least one propagation model (second set of propagation model(s)). A fourth set of at least one propagation model (fourth set of propagation model(s)) is used to determine a subset of the subset of points to be analyzed by propagation model(s) of the second set. Each propagation model of the second set corresponds to a unique subset of the subset of points and may correspond to a propagation model of the third set. The second set may or may not include one or more of the propagation models of other sets of propagation models. The third set may or may not include one or more of the propagation models of other sets of propagation models. If, for example, the second set consists of the ITM and the eHata propagation model, then aggregate interference at a first subset of the subset of points is analyzed with ITM, and aggregate interference at a second subset of the subset of points is analyzed with the eHata propagation model.

If the average land category for the region is the certain land category type, then a subset of points is determined which are analyzed with a third set of at least one propagation model (third set of propagation model(s)). A fifth set of at least one propagation model (fifth set of propagation model(s)) is used to determine a subset of the subset of points to be analyzed by a propagation model of the third set. Each propagation model of the third set corresponds to a unique subset of the subset of points and may correspond to a propagation model of the fifth set. The third set may or may not include one or more propagation models of the other sets. The fifth set may or may not include one or more propagation models of the other sets. If, for example, the third set consists of the eHata propagation model, then aggregate interference at the subset of points is analyzed with the eHata propagation model.

For pedagogical reasons, the specific land use category analyzed will be illustrated as being rural; however, it may be another land use category. For pedagogical reasons, the first set is illustrated herein consists of the enhanced Hata propagation model, the second set illustrated herein consists of the irregular terrain model and the eHata propagation model, the third set illustrated herein consists of ITM, the fourth set is illustrated herein consists of the free space path loss model, and the fifth set illustrated herein consists of the free space path model. However, as there are many propagation models, other models may be used. For example, the Hata model can be used in lieu of the eHata propagation model.

Based upon determination of the subset of points and corresponding propagation model(s), determine aggregate interference at each point, and maximum power levels of CBSDs using the corresponding propagation model for the corresponding subset of points to allocate interference margins to the CBSDs. Optionally, the maximum power levels are communicated to the corresponding CBSDs.

Because the present invention may be applicable to systems other than SAS, CBSD, protection point, and PPA or GWPZ, shall hereinafter be referred to respectively as "radio", "point", and "region". Radio means a radio that is controlled by a SAS controller, or similar device of a shared spectrum system. For example, the present invention may also be applicable to Licensed Shared Access systems being developed in Europe. IAP is more generally referred to as power allocation process; techniques other than the IAP specified in the requirement may be used for the power allocation process.

A technique is provided for more efficiently determining points for corresponding propagation models to be used in to allocate power for CBSD, e.g. that are at distances between 1 km and 80 km from a corresponding protection point. However, the range of distance may vary by application.

Embodiments of the invention determine which points need be analyzed for the power allocation process. Embodiments reduce the number of protection points in a region to be analyzed by one set of propagation models which is used to determine aggregate interference at protection points and maximum transmission power of radios.

Figure 1:
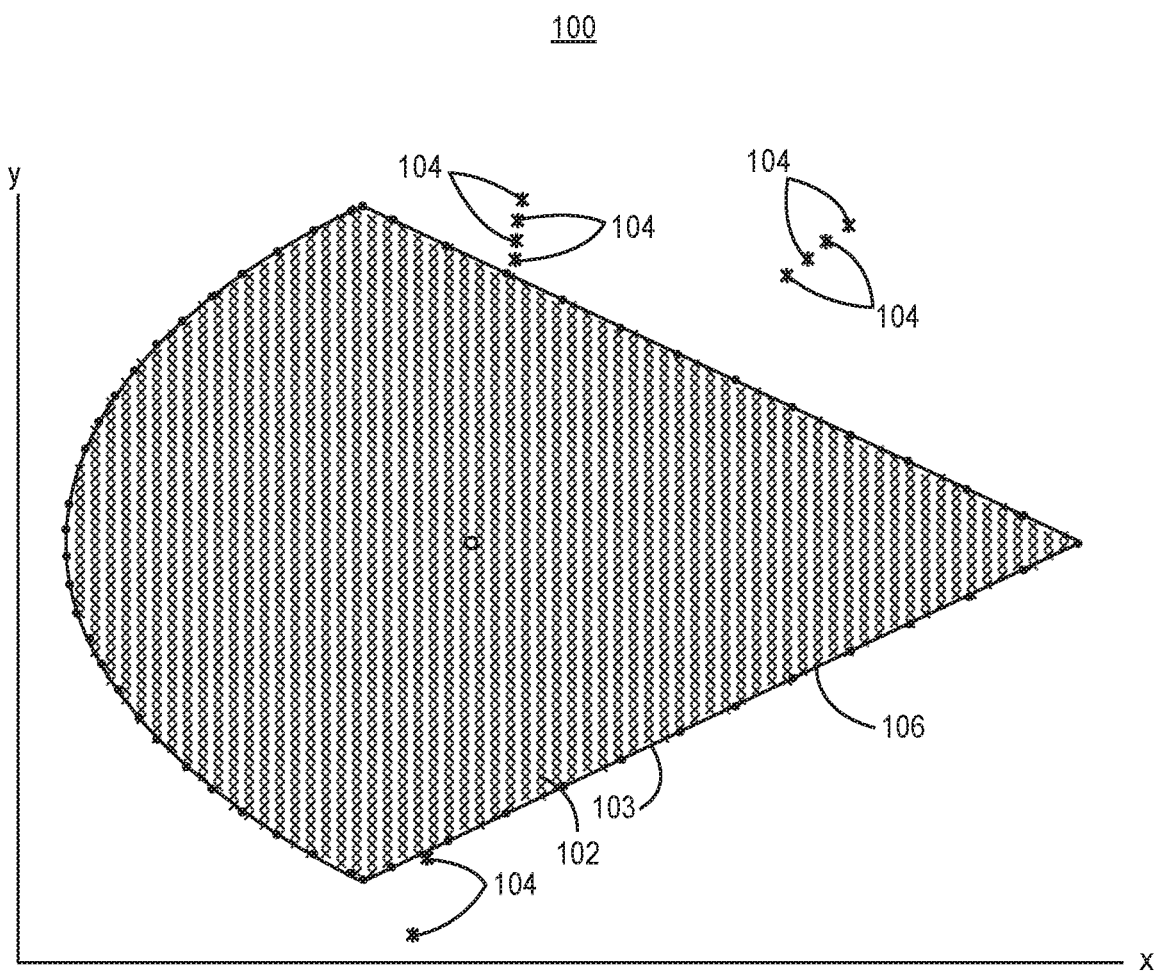
FIG. 1 illustrates an exemplary diagram of a region and proximate radios.

FIG. 1 illustrates an exemplary diagram of a region and proximate radios 100. The region 103 is formed by a contour 106 surrounding the points 102. In this example, the points on the contour of the region occur at a resolution of eight arc second; however other resolutions may be used. Radios 104 are located outside of the region 103. The aggregate interference at each point in the region 103 must not exceed an interference threshold power level. Power level, as used herein, may refer to a power level or a power spectral density level.

Figure 2:
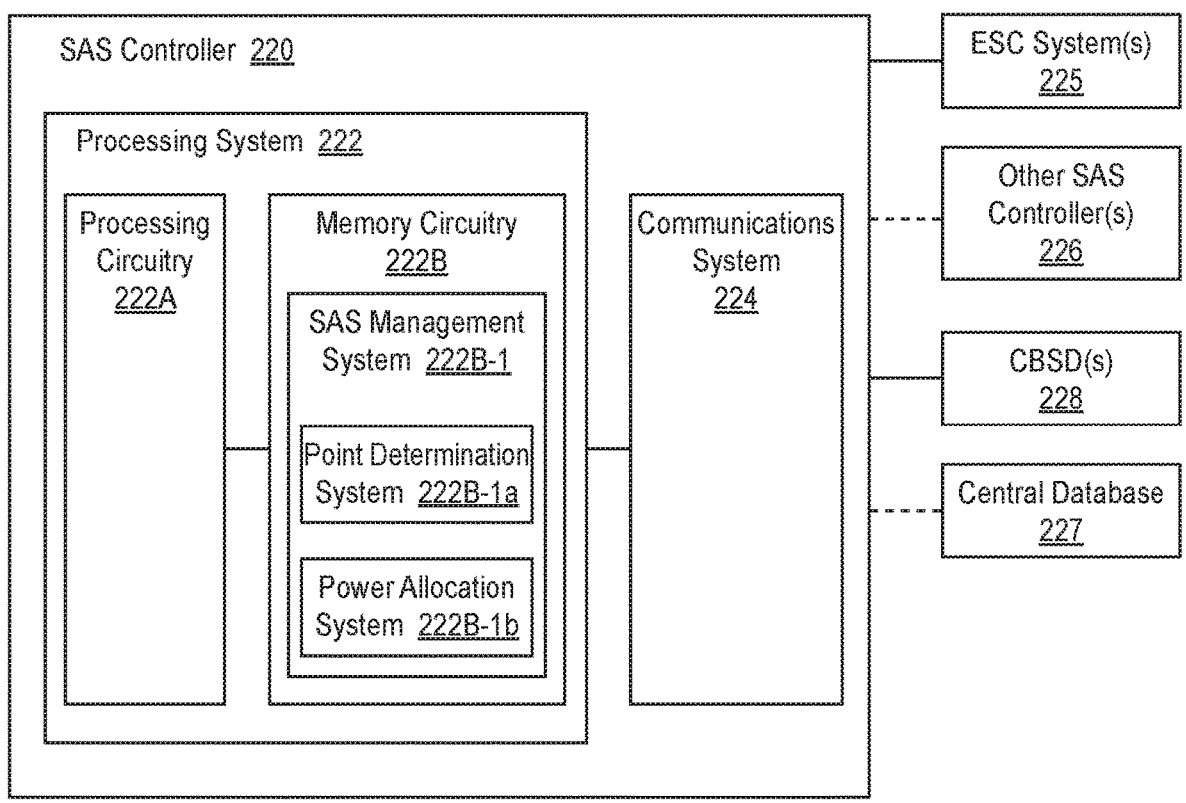
FIG. 2 illustrates one embodiment of a shared access system that is implemented according to embodiments of the invention.

FIG. 2 illustrates one embodiment of a SAS 200 that is implemented according to embodiments of the invention. The illustrated SAS 200 includes a SAS controller 220 coupled to one or more CBSDs (CBSD(s)) 228. Each CBSD is operated by a GAA user and/or a PAL.

Optionally, the SAS controller 220 is coupled to at least one environmental sensing capability system (ESC system(s)) 225. Optionally, the SAS controller 220 is coupled to a central database 227, e.g. which has information about when certain incumbent users (such as satellite ground stations) and/or PALs are transmitting. Optionally, the SAS controller 220 is coupled to at least one other SAS controller (other SAS controller(s)) 226, e.g. controlling other CBSDs operating in the same or overlapping frequency spectra. For example, such other CBSDs controlled by other SAS controller(s) 226 and their PALs, GAA users, and associated incumbent users may generate electromagnetic energy that overlaps the geographic region and frequency spectra of the CBSDs 228 controlled by SAS 220, and thus must be accounted for by the SAS 220 when the SAS 220 performs interference analysis and authorizes operation of CBSD(s) 228 of the PAL(s) and/or the GAA user(s). Alternatively, the SAS 220 and its PALs and GAA users, may generate electromagnetic energy that overlaps the geographic region of the other SAS(s) 226, and thus must be accounted for by the other SAS controller(s) 226 when the other SAS(s) 226 perform interference analysis, and authorize operation of CBSDs of PALs and GAA users (associated with the other SAS(s) 226). By coupling SASs that are geographically proximate to one another, each SAS can account for electromagnetic energy emitted from those proximate geographies.

The ESC system 225 detects, and communicates to the SAS controller 220, the presence of signal(s), e.g. from some incumbent user(s), such as RADARs. Alternatively, incumbent users can inform the SAS controller 225 that they are operating, e.g. by transmitting a signal beacon, or communicating with the central database 227 which may be coupled to the SAS controller 220. Prior to notification of operation of an incumbent, the SAS controller 220 models aggregate interference where the incumbent user is or may be located, and may determine whether certain transmission powers of certain CBSDs should be reduced, e.g. to zero, in a frequency spectra. Upon notification of operation of an incumbent user, the SAS controller 220 regulates the operation (e.g. power levels and frequencies of operation) of the CBSD(s) to allow the incumbent user(s) to operate free of interference. The SAS controller 220 otherwise controls the operation (e.g. power levels and frequencies of operation) of the GAA user(s)' CBSD(s) so that the PAL(s) system(s) operate free of interference.

In one embodiment, the SAS controller 220 includes a processing system 222 coupled to a communications system 224. The processing system 222 controls the operation of CBSD(s) 228 that form part of the SAS 200.

The communications system 224 facilitates communications between the SAS controller 220 and other systems or devices, e.g. CBSD(s) 228, the ESC system(s) 125, the central database 227, and/or other SAS(s) 226. In one embodiment, the communications system 224 includes a modem, e.g. an Internet data modem, a radio, and/or any other communications device(s) that can facilitate communications to the aforementioned devices.

Optionally, the processing system (or processing system circuitry) 222 may be a state machine, e.g. comprised of processor circuitry 222A coupled to memory circuitry 222B; alternatively, the processing system 222 may be implemented in whole or in part as a neural network. In the illustrated embodiment, the memory circuitry 222B includes a SAS management system 222B-1. In the illustrated embodiment, the SAS management system 222B-1 includes a propagation model and point determination system 222B-1a and a power allocation system 222B-1b. The propagation model and point determination system 222B-1a determines which propagation model to use and/or which points of a region to analyze for the power allocation process, as further described herein. The power allocation system 222B-1b determines the maximum power level of certain radios. Optionally, the power allocation system 222B-1b is implemented with power allocation process that operates substantially accordingly to requirement R2-SGN-16; however, the power allocation system 222B-1b may be implemented in other ways to allocate, e.g. equitably, transmission power of CBSDs.

The SAS management system 222B-1 also includes techniques for generating a discovery area around a region including one or more protection points, and determining the aggregate level of interference in frequency spectra at each protection point. To this end, the SAS management system 222B-1 may include propagation models (e.g. free space path loss model, irregular terrain model and/or Hata model (or variations thereof such as the eHata model)) with which to determine path loss between CBSDs and protection point(s). The SAS management system 222B-1 may also include a database of information about CBSDs (e.g. geographic location, height, terrain morphology, and/or effective radiated power information); additionally and/or alternatively, the SAS management system 222B-1 may remotely obtain such information.

Figure 3A:
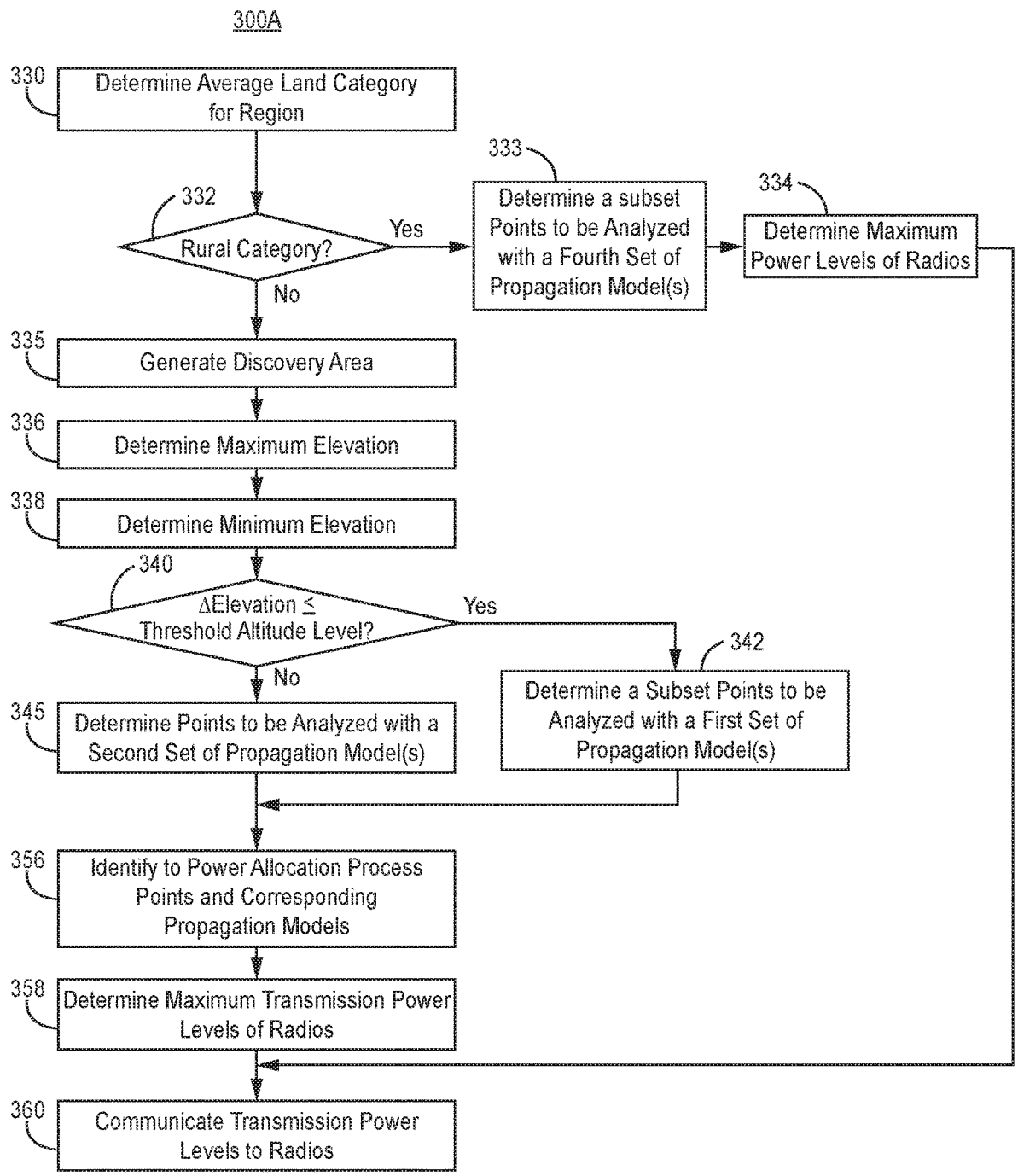
FIG. 3A illustrates one embodiment of a method of determining points and corresponding propagation models to be used when determining power allocation amongst radios.

FIG. 3A illustrates one embodiment of a method of determining points and corresponding propagation models to be used when determining power allocation amongst radios 300A. To the extent that the method 300A shown in FIG. 3A is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 330, determine average land category for a region. Land category may be, e.g. one of urban, suburban, or rural as defined by the U.S. National Land Cover Database. For example, determine every land category for each 1 arc second pixel. Assign a value for each category. Average the corresponding values of the pixels, and determine the average land category from the average of the pixels. Each pixel represents a geographic location. Alternatively, the average land category for the region was previously determined. For a GWPZ, the region will likely have been previously defined and analyzed, and so factors such as average land category are already known. This would also be the case for determining maximum and minimum terrain elevations further described below in blocks 336 and 338. This may not be the case though for regions that are PPAs.

In block 332, determine if the average land category for the region is a rural category. If the average land category for the region is rural, proceed to optional block 333 or to block 334. Optionally, in block 333, determine a third subset of points to be analyzed to determine a maximum power level of each radio in a discovery area using the third set of propagation model(s), e.g. the irregular terrain model. Thus, each point in the subset of points is associated with a unique propagation model of the third set, e.g. the ITM.

Then, optionally in block 334, determine a maximum power level of each radio in the discovery area using the third set using all points (or if optional block 333 was performed only using the third subset). Determination of a maximum power level may be accomplished by performing a power allocation process, e.g. using the analysis technique illustrated in requirement R2-SGN-04 using the ITM, at all points to determine aggregate interference at each point. In the alternative, determination of the maximum power level may be accomplished by performing a power allocation processing using a free space path loss model at all points to determine aggregate interference at each point; this technique is more efficient because elevation data is not required for free space path loss analysis. Optionally, after block 334, proceed to block 360.

FIG. 4A illustrates one embodiment of identifying points to be analyzed to determine a maximum power level of each radio in a discovery area using a third set of propagation model(s) 400A. Method 400A illustrates one embodiment of an implementation block 333. To the extent that the method 400A shown in FIG. 4A is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). The third set of propagation model(s) consists of the ITM. However, the technique may be used for other propagation models.

Optionally, in block 490, generate a discovery area around the region as described elsewhere herein. In block 492, using the fifth set of propagation model(s), e.g. the free space path loss model (described elsewhere herein), determine aggregate power level at each point for the radios in the discovery area. Optionally, if the third set includes the ITM, the fifth set includes the free space path model to determine the subset of points to be modelled using ITM; the free space path model may be used in lieu of ITM to reduce processing time and resources; however, if there are sufficient processing time and resources, then the ITM may be used rather than the free space path model. Then, in block 494, determine the third subset of points to be analyzed with the third set of propagation model(s), e.g. the irregular terrain model—or alternatively another model such as the free space path loss model—when performing power analysis. For example, to determine such points, identify all points having an aggregate power level (due to radios in the discovery area) greater or equal to a threshold power level, e.g. −85 dBm.

Figure 3B:
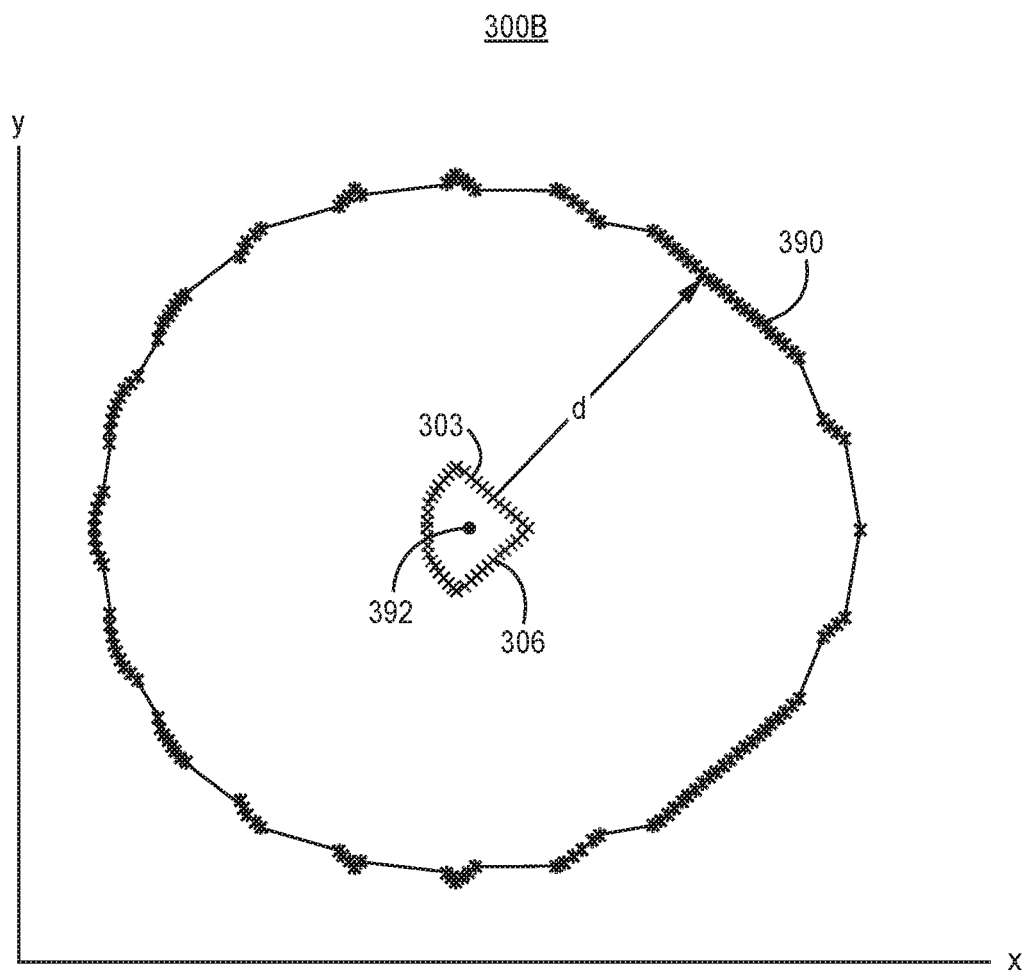
FIG. 3B illustrates one embodiment of a discovery area.

Returning to FIG. 3A, if the average land category for the region is not rural, then in block 335 generate a discovery area around the region. FIG. 3B illustrates one embodiment of a discovery area 300B. The discovery area 300B is an area enclosed in a contour 390 that is, e.g. a fixed distance d (for example 40 km) from, e.g. the points comprising, a contour 306 enclosing the region 303. However, in alternative embodiments, the discovery area may be calculated differently, e.g. where the contour of the discovery area 300B is a certain distance from a centroid 392 of the region 303.

Returning to FIG. 3A, in block 336 determine a maximum elevation, e.g. terrain elevation, of all radios in discovery area. This may be done by obtaining terrain elevations, e.g. from a remote database, every fixed number of arc seconds, e.g. 20 arc seconds around the discovery area. Then, the maximum elevation is identified from such obtained terrain elevations. In block 338, determine a minimum elevation of all of the points in the region. Terrain elevations may be obtained from a remote database.

In block 340, determine if the maximum elevation minus the minimum elevation is greater than a threshold altitude level, e.g. 600 meters. The threshold altitude level corresponds a distance where line of sight communications can occur between points corresponding to the maximum elevation of a radio and the minimum elevation of a point.

If the maximum elevation minus the minimum elevation (also referred to herein in as the "ΔElevation") is not greater than (or is less than or equal than) the threshold altitude level, then in block 342 determine a second subset of points at which aggregate interference—caused by radios in the discovery area—will be analyzed. Aggregate interference is determined for each point with a propagation model of the first set, e.g. the eHata propagation model, associated with the point. Aggregate interference is analyzed to determine a maximum power level of the radios in the discovery area.

The subset of protection points is used when performing the power allocation process using the first set. Then, optionally proceed to block 356 or block 358.

FIG. 4B illustrates one embodiment of a determining protection points to be analyzed with the second set of propagation model(s) 400B. FIG. 4B illustrates one embodiment of how to determine protection points to be analyzed with the second set of propagation model(s), e.g. when performing the power allocation process. Thus, FIG. 4B illustrates one embodiment of how to implement block 342 and/or block 470. To the extent that the method 400B shown in FIG. 4B is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). In one embodiment, the second set of propagation model(s) consists of the eHata propagation model. However, the technique may be used for other propagation models.

In block 440, set P=0. In block 442, determine a number of radios, $N_c$, within a radial distance X of a point of the region 303 and in an arc width, Z, e.g. 2 arc seconds, and whose center line is at an angle of Q degrees with respect to a centroid 392 of the region 303; Q=Z*P. Optionally, X is 2 km; however, X may be another value that is empirically determined. In block 444, determine if the number of radios is greater than zero. If the number of radios is not greater than zero (e.g. equals zero), then proceed to block 452. If the number of radios is greater than zero, then in block 446 determine r, the radius of a circle, where for example, $$r(\text{in km}) = \begin{cases} d_s & N_c = 1 \\ 2.5 & N_c = 2 \\ d_s * \log_2 N_c & N_c > 2 \end{cases} \quad \text{(Equation 1)}$$

$d_s$ is an empirically determined constant, e.g. 2 km. The foregoing relationship has been empirically derived. Alternatively, a closed form equation may be empirically determined and used to calculate r.

In block 448, generate a circle having radius r around a centroid of the radios identified in block 442. In block 450, determine the points in the region encompassed in the circle.

In block 452, set P=P+1. In block 454, determine if Q is greater than or equal to three hundred and sixty degrees. If Q is not greater than or equal to three hundred and sixty degrees, then return to block 442. If Q is greater than or equal to three hundred and sixty degrees, then in block 456 determine the union of all points determined, in block 450, to be in a circle for each angle in block 450. This union of points are the only points that need be analyzed when performing the power allocation process. Optionally, such points are analyzed using, for block 342, a propagation model of the first set of propagation model(s) or using, for block 470, a propagation model of the second set of propagation model(s); optionally, the propagation models of the first set and the second set used in the aforementioned technique is the eHata propagation model.

FIG. 5 illustrates one embodiment of a diagram illustrating points within circles that must be considered for power allocation processing using the second set of propagation model(s) 500. The circles 552A, 552B (encompassing the points 550A, 550B) are centered at the centroids 554A, 554B of the identified or determined radios. For example, one set of identified radios 556A-1, 556A-2, 556A-3, 556A-4 is shown in a circle 552A.

Returning to FIG. 3A, if the maximum elevation minus the minimum elevation is greater than (or not less than or equal to) a threshold altitude, then in block 345, determine a first subset of points at which aggregate interference—caused by radios in the discovery area—will be analyzed. Aggregate interference is determined for each point with a propagation model of the second set of propagation model(s), e.g. the eHata propagation model or ITM, associated with the point. Aggregate interference is analyzed to determine a maximum power level of the radios in the discovery area.

The third set of propagation models(s) is used to determine a subset of points to be analyzed to determine radio maximum power levels using the second set of propagation model(s). One subset of a subset of points is determined for each propagation model of the second set. Each propagation model of the second set of propagation model(s) corresponds to a unique subset of the subset of points and a propagation model of the third set. Optionally, if the second set of propagation model(s) includes the ITM, the third set includes the free space path model to determine the subset of points to be modelled using ITM; the free space path model may be used in lieu of ITM to reduce processing time and resources; however, if there are sufficient processing time and resources, then the ITM may be used rather than the free space path model. In block 356, optionally identify to a power allocation process each subset of the subset of points determined to be analyzed, and the corresponding propagation model to be used to analyze each subset of the subset of points. In other words, identify to a power allocation process all points identified to be analyzed, and a corresponding propagation model to be used with each point.

After blocks 342, 345, or 356, optionally in block 358, determine maximum transmission power of radios for the corresponding subset of points using a power allocation process by analyzing aggregate interference at each point of the corresponding determined subset of points (e.g. the first subset or the second subset), radios within the discovery area, and a propagation model corresponding to the point. Optionally, after blocks 334 and 358, in block 360, communicate determined maximum transmission powers to corresponding radios. In another optional embodiment, set the transmission powers of such radios to the corresponding communicated powers; when transmitting the radios will transmit at the corresponding communicated powers.

FIG. 4C illustrates one embodiment of a determining protection points to be analyzed with a third set of propagation models 400C. Further, FIG. 4C illustrates one embodiment of how to implement block 345. To the extent that the method 400C shown in FIG. 4C is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). For the illustrated embodiment, the third set consists of the ITM and the eHata propagation model. However, the technique may be used for other propagation models can be used.

In block 460, obtain data for radios in the discovery area. Such data includes at least one of antenna height, antenna gain, and transmission power level. Optionally, in block 462, determine an average terrain height of the points in the region. For a GWPZ, such data may have previously been generated. In block 464, identify the radios in the discovery area whose effective antenna height less the average terrain height of the points in the region is greater than a threshold height or height threshold, e.g. 200 meters, which is empirically determined. Effective antenna height is the altitude of the terrain at the location of the antenna plus the height of the antenna above the terrain. In block 466, using a free space path loss model, determine aggregate power level at each protection point for the radios identified in block 464. The power level contribution to the aggregate power level at each point is determined using the obtained data. The power at a protection point from a single radio may be calculated as follows:

$$\text{rxPower} = \text{txPower} + \text{Gain} - \text{FSPL}, \quad \text{(Equation 2)}$$

where txPower is transmitter power of the radio, e.g. in dBm,
Gain is antenna gain (dBi) of the radio, and
FSPL is path loss of a signal, e.g. in dB, computed using a free space model:

$$\text{Free space Path Loss (dB)} = 20 \log_{10} d + 20 \log_{10} f + 32.45, \quad \text{(Equation 3)}$$

where d is the distance between transmitter and receiver in km and f is the frequency in MHz and the constant 32.45 is derived from $20 \log_{10}(4*\pi/c)$.

In block 468, determine a first subset of the subset of points at which aggregate interference from radios will be analyzed with a first propagation model, e.g. ITM, of the second set of propagation models. Such points are determined by determining points having an aggregate interference level greater than a threshold level, where aggregate interference from radios at such points will be subsequently analyzed with another propagation model of the second set, e.g. the irregular terrain model, when determining maximum transmission power of radios in the discovery area. Thus, each point in the first subset of the subset of points is associated with another propagation model of the second set, e.g. the ITM. For example, to determine such points, identify all points having an aggregate power level greater or equal to a threshold power level, e.g. −85 dBm.

In block 470, determine second subset of the subset of points at which aggregate interference from radios will be analyzed with a second propagation model of the second set of propagation models, e.g. the eHata propagation model, when determining maximum transmission power of radios in the discovery area. Thus, each point in the second subset of the subset of points is associated with a propagation model of the second set, e.g. the eHata propagation model.

A processing system used in the present system and method can be implemented using software, firmware, hardware, or any appropriate combination thereof, as known to one of skill in the art. By way of example and not limitation, the processor circuitry 222A can include one or more of each of microprocessor circuitry, microcontroller circuitry, Digital Signal Processors (DSP) circuitry, Application Specific Integrated Circuits (ASICs), programmable logic device circuitry, and/or Field Programmable Gate Array (FPGA) circuitry. The processing system can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

Suitable computer readable media may include storage or memory media such as the memory circuitry 222B illustrated herein. For example, the memory circuitry 222B may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RANI (SRAM)), Read Only Memory (ROM), Electrically Erasable Programmable ROM (EEPROM), and Flash memory.

Exemplary Embodiments

Example 1 includes a program product for diminishing the number of points used to allocate interference margin to radios comprising a non-transitory processor readable medium on which program instructions are embodied, wherein the program instructions are configured, when executed by at least one programmable processor, to cause the at least one programmable processor to: determine that an average land category for a region is not a certain land category type, where the region comprises points; upon determining that the average land category for the region is not the certain land category type, then: generate a discovery area around the region; determine a maximum elevation of all radios in the discovery area; determine a minimum elevation of all points in the region; determine that the maximum elevation less the minimum elevation is less than or equal to a differential altitude; and upon determining that the maximum elevation less the minimum elevation is not less than or equal to the differential altitude, then determine a subset of points in the discovery area at which aggregate interference from radios in the discovery area analyzed, where aggregate interference for each point is determined with a propagation model of a set of at least one propagation model to determine a maximum transmission power of the radios in the discovery area, and where the radios in the discovery area are configured to transmit at a power level equal to or less than the determined maximum power level.

Example 2 includes the program product of Example 1, wherein the program instructions are configured, when executed by at least one programmable processor, to further cause the at least one programmable processor to identify the determined subset of points and a corresponding propagation model to be used with each point.

Example 3 includes the program product of any of Examples 1-2, wherein the program instructions are configured, when executed by at least one programmable processor, to further cause the at least one programmable processor to determine, using a corresponding propagation model, the aggregate interference for each point and the maximum transmission power of the radios in the discovery area.

Example 4 includes the program product of any of Examples 1-3, wherein the program instructions are configured, when executed by at least one programmable processor, to further cause the at least one programmable processor to communicate a determined maximum transmission power to each radio in the discovery area.

Example 5 includes the program product of any of Examples 1-4, wherein the certain land category type is rural.

Example 6 includes the program product of any of Examples 1-5, wherein the set of propagation models consists of an enhanced Hata propagation model.

Example 7 includes the program product of any of Examples 1-6, wherein determine the subset of points comprises: set P=0; determine a number of radios, $N_c$, within a radial distance X of a point of the region and in an arc width, Z, whose center line is at an angle Q degrees with respect to the center of the region, where Q=Z*P; determine that the number of radios is greater than zero; upon determining that the number of radios is greater than zero, then: determine a radial distance of a circle, where $$r(\text{in km}) = \begin{cases} d_s & N_c = 1 \\ \text{Example 2.5} & N_c = 2 \\ d_s * \log_2 N_c & N_c > 2 \end{cases}$$

where $d_s$ is an empirically determine constant; generate the circle having radius r around a centroid of the radios within the radial distance X of the point of the region and in the arc width Z; determine points in the region encompassed by the circle; set P=P+1; determine that Q is greater than or equal to three hundred and sixty degrees; and upon determining that Q is greater than or equal to zero, then determining a union of all points determined for each angle, where the subset consists of the union of points.

Example 8 includes the program product of any of Examples 1-7, wherein determine the subset of points comprises: set P=0; determine a number of radios, $N_c$, within a radial distance X of a point of the region and in an arc width, Z, whose center line is at an angle Q degrees with respect to the center of the region, where Q=Z*P; determine that the number of radios equals zero; set P=P+1; determine that Q is greater than or equal to three hundred and sixty degrees; and upon determining that Q is greater than or equal to zero, then determine a union of all points determined for each angle, where the subset consists of the union of points.

Example 9 includes a program product for diminishing the number of points used to allocate interference margin to radios comprising a non-transitory processor readable medium on which program instructions are embodied, wherein the program instructions are configured, when executed by at least one programmable processor, to cause the at least one programmable processor to: determine that an average land category for a region is not a certain land category type, where the region comprises points; upon determining that the average land category for the region is not the certain land category type, then: generate a discovery area around the region; determine a maximum elevation of radios in the discovery area; determine a minimum elevation of all points in the region; determine that the maximum elevation less the minimum elevation is not less than or equal to the differential altitude; upon determining that the maximum elevation less the minimum elevation is less than or equal to the differential altitude, then determine a subset of points at which aggregate interference from the radios in discovery area will be analyzed, where aggregate interference for each point is determined with a propagation model of a set of at least one propagation model to determine a maximum transmission power of the radios in the discovery area, and where the radios in the discovery area are configured to transmit at a power level equal to or less than the determined maximum power level.

Example 10 includes the program product of Example 9, wherein the program instructions are configured, when executed by at least one programmable processor, to further cause the at least one programmable processor to identify the determined subset of points and a corresponding propagation model to be used with each point.

Example 11 includes the program product of any of Examples 9-10, wherein the program instructions are configured, when executed by at least one programmable processor, to further cause the at least one programmable processor to determine, using a corresponding propagation model, the aggregate interference for each point and the maximum transmission power of the radios in the discovery area.

Example 12 includes the program product of any of Examples 9-11, wherein the program instructions are configured, when executed by at least one programmable processor, to further cause the at least one programmable processor to communicate a determined maximum transmission power to each radio in the discovery area.

Example 13 includes the program product of any of Examples 9-12, wherein the certain land category type is rural.

Example 14 includes the program product of any of Examples 9-13, wherein determine the subset of points comprises: determine a first subset of the subset of points; determine a second subset of the subset of points; and wherein aggregate interference for each point of the first subset is determined with a first propagation model of the first set of at least one propagation model; and wherein aggregate interference for each point of the second subset is determined with a second propagation model of the first set of at least one propagation model.

Example 15 includes the program product of Example14, wherein the first propagation model is an irregular terrain model and the second propagation model is an enhanced Hata propagation model and an irregular terrain model.

Example 16 includes the program product of any of Examples 14-15, wherein determining the first subset comprises: obtain data about radios in the discovery area, where such data comprises at least one of antenna height, antenna gain, and transmission power level; identify radios in the discovery area whose effective antenna height less the average terrain height of the points in the region is greater than a height threshold level; determine, using a second set of at least one propagation model, aggregate interference level at each point from all identified radios; and determine points having an aggregate interference level greater than an interference threshold level.

Example 17 includes the program product of any of Examples 14-16, wherein the first propagation model consists of an irregular terrain model.

Example 18 includes the program product of any of Examples 16-17, wherein the second set of at least one propagation model consists of a free space path loss model.

Example 19 includes the program product of any of Examples 14-18, wherein determining the second subset comprises: set P=0; determine a number of radios, $N_c$, within a radial distance X of a point of the region and in an arc width, Z, whose center line is at an angle Q degrees with respect to the center of the region, where Q=Z*P; determine that the number of radios is greater than zero; upon determining that the number of radios is greater than zero, then: determine a radial distance of a circle, where $$r(\text{in km}) = \begin{cases} d_s & N_c = 1 \\ \text{Example 2.5} & N_c = 2 \\ d_s * \log_2 N_c & N_c > 2 \end{cases},$$

where $d_s$ is an empirically determine constant; generate the circle having radius r around a centroid of the radios within the radial distance X of the point of the region and in the arc width Z; determine points in the region encompassed by the circle; set P=P+1; determine that Q is greater than or equal to three hundred and sixty degrees; and upon determining that Q is greater than or equal to zero, then determining a union of all points determined for each angle, where the subset consists of the union of points.

Example 20 includes the program product of any of Examples 14-19, wherein determining the second subset of points comprises: set P=0; determine a number of radios, $N_c$, within a radial distance X of a point of the region and in an arc width, Z, whose center line is at an angle Q degrees with respect to the center of the region, where Q=Z*P; determine that the number of radios equals zero; set P=P+1; determine that Q is greater than or equal to three hundred and sixty degrees; and upon determining that Q is greater than or equal to zero, then determine a union of all points determined for each angle, where the subset consists of the union of points.

Example 21 includes a program product for diminishing the number of points used to allocate interference margin to radios comprising a non-transitory processor readable medium on which program instructions are embodied, wherein the program instructions are configured, when executed by at least one programmable processor, to cause the at least one programmable processor to: determine that an average land category for a region is the certain land category type; and upon determining that the average category for the region is the certain land category type, then determine a subset of points at which aggregate interference from the radios in discovery area will be analyzed, where aggregate interference for each point is determined with a propagation model of a first set of at least one propagation model to determine a maximum transmission power of the radios in the discovery area, and where the radios in the discovery area are configured to transmit at a power level equal to or less than the determined maximum power level.

Example 22 includes the program product of Example 21, wherein the program instructions are configured, when executed by at least one programmable processor, to further cause the at least one programmable processor to identify the determined subset of points and a corresponding propagation model to be used with each point.

Example 23 includes the program product of any of Example 21-22, wherein the program instructions are configured, when executed by at least one programmable processor, to further cause the at least one programmable processor to determine, using a corresponding propagation model, the aggregate interference for each point and the maximum transmission power of the radios in the discovery area.

Example 24 includes the program product of any of Examples 21-23, wherein the program instructions are configured, when executed by at least one programmable processor, to further cause the at least one programmable processor to communicate a determined maximum transmission power to each radio in the discovery area.

Example 25 includes the program product of any of Examples 21-24, wherein the certain land category type is rural.

Example 26 includes the program product of any of Examples 21-25, wherein the set of propagation models consists of an irregular terrain model.

Example 27 includes the program product of any of Examples 21-26, wherein determine the subset of points comprises: generate a discovery area around the region; determine, using a second set of at least one propagation model, aggregate power level at each point in the region for the radios in the discovery area; and determine points having an aggregate interference level greater than an interference threshold level.

Several embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:
1. A program product for diminishing a number of points used to allocate interference margin to radios in a discovery area comprising a non-transitory processor readable medium on which program instructions are embodied, wherein the program instructions are configured, when executed by at least one programmable processor, to cause the at least one programmable processor to:
  determine that an average land category for a region is not a rural land category type as defined by the United Stated of America national land cover database, where the region comprises points; and
  upon determining that the average land category for the region is not the rural land category type, then:
    generate the discovery area around the region;
    determine a maximum elevation of the radios in the discovery area;
    determine a minimum elevation of all points in the region;
    determine that the maximum elevation less the minimum elevation is less than or equal to a differential altitude; and
    upon determining that the maximum elevation less the minimum elevation is not less than or equal to the differential altitude, then determine a subset of points in the discovery area at which aggregate interference from certain radios in the discovery area will be analyzed, where aggregate interference for each point is determined with a propagation model of a set of at least one propagation model to determine a maximum transmission power level of each of the radios in the discovery area, where the certain radios in the discovery area are configured to transmit at a power level equal to or less than a corresponding determined maximum transmission power level, and where the certain radios in the discovery area comprise all or a subset of the radios in the discovery area.

2. The program product of claim 1, wherein the program instructions are configured, when executed by at least one programmable processor, to further cause the at least one programmable processor to identify the determined subset of points and a corresponding propagation model to be used with each point.

3. The program product of claim 1, wherein the program instructions are configured, when executed by at least one programmable processor, to further cause the at least one programmable processor to determine, using a corresponding propagation model, the aggregate interference for each point and the maximum transmission power level of each of the radios in the discovery area.

4. The program product of claim 1, wherein the program instructions are configured, when executed by at least one programmable processor, to further cause the at least one programmable processor to communicate a determined maximum transmission power level to each radio in the discovery area.

5. The program product of claim 1, wherein the set of at least one propagation model consists of an enhanced Hata propagation model.

6. The program product of claim 1, wherein determine the subset of points comprises:
  set P=0;
  determine a number of radios, $N_c$, within a radial distance X of a point of the region and in an arc width, Z, whose center line is at an angle Q degrees with respect to a center of the region, where Q=Z*P;
  determine that the number of radios is greater than zero;
  upon determining that the number of radios is greater than zero, then:

determine a radial distance of a circle, where $$r(\text{in km}) = \begin{cases} d_s & N_c = 1 \\ 2.5 & N_c = 2 \\ d_s * \log_2 N_c & N_c > 2 \end{cases},$$

and
  where $d_s$ is an empirically determine constant;
  generate the circle having radius r around a centroid of the radios within the radial distance X of the point of the region and in the arc width Z;
  determine points in the region encompassed by the circle;
  set P=P+1;
  determine that Q is greater than or equal to three hundred and sixty degrees; and
  upon determining that Q is greater than or equal to zero, then determining a union of all points determined for each angle, where the subset consists of the union of points.

7. The program product of claim 1, wherein determine the subset of points comprises:
  set P=0;
  determine a number of radios, $N_c$, within a radial distance X of a point of the region and in an arc width, Z, whose center line is at an angle Q degrees with respect to a center of the region, where Q=Z*P;
  determine that the number of radios equals zero;
  set P=P+1;
  determine that Q is greater than or equal to three hundred and sixty degrees; and
  upon determining that Q is greater than or equal to zero, then determine a union of all points determined for each angle, where the subset consists of the union of points.

8. The program product of claim 1, wherein the certain radios are radios within a radial distance X of a point of the region.

9. A program product for diminishing a number of points used to allocate interference margin to radios in a discovery area comprising a non-transitory processor readable medium on which program instructions are embodied, wherein the program instructions are configured, when executed by at least one programmable processor, to cause the at least one programmable processor to:
  determine that an average land category for a region is not a rural land category type as defined by the United Stated of America national land cover database, where the region comprises points; and
  upon determining that the average land category for the region is not the rural land category type, then:
  generate the discovery area around the region;
  determine a maximum elevation of the radios in the discovery area;
  determine a minimum elevation of all points in the region;
  determine that the maximum elevation less the minimum elevation is not less than or equal to a differential altitude; and
  upon determining that the maximum elevation less the minimum elevation is less than or equal to the differential altitude, then determine a subset of points at which aggregate interference from certain radios in discovery area will be analyzed, where aggregate interference for each point is determined with a propagation model of a set of at least one propagation model to determine a maximum transmission power level of each of the radios in the discovery area, where the radios in the discovery area are configured to transmit at a power level equal to or less than a corresponding determined maximum transmission power level, and where the certain radios in the discovery area comprise all or a subset of all of the radios in the discovery area.

10. The program product of claim 9, wherein the program instructions are configured, when executed by at least one programmable processor, to further cause the at least one programmable processor to identify the determined subset of points and a corresponding propagation model to be used with each point.

11. The program product of claim 9, wherein the program instructions are configured, when executed by at least one programmable processor, to further cause the at least one programmable processor to determine, using a corresponding propagation model, the aggregate interference for each point and the maximum transmission power level of each of the radios in the discovery area.

12. The program product of claim 9, wherein the program instructions are configured, when executed by at least one programmable processor, to further cause the at least one programmable processor to communicate a determined maximum transmission power level to each radio in the discovery area.

13. The program product of claim 9, wherein determine the subset of points comprises:
  determine a first subset of the subset of points;
  determine a second subset of the subset of points; and
  wherein aggregate interference for each point of the first subset is determined with a first propagation model of the first set of at least one propagation model;
  wherein aggregate interference for each point of the second subset is determined with a second propagation model of the first set of at least one propagation model.

14. The program product of claim 13, wherein the first propagation model is an irregular terrain model and the second propagation model is an enhanced Hata propagation model and an irregular terrain model.

15. The program product of claim 13, wherein determining the first subset comprises:
  obtain data about radios in the discovery area, where such data comprises at least one of antenna height, antenna gain, and transmission power level;
  identify radios in the discovery area whose effective antenna height less an average terrain height of the points in the region is greater than a height threshold level;
  determine, using a second set of at least one propagation model, aggregate interference level at each point from all identified radios; and
  determine points having an aggregate interference level greater than an interference threshold level.

16. The program product of claim 15, wherein the second set of at least one propagation model consists of a free space path loss model.

17. The program product of claim 13, wherein the first propagation model consists of an irregular terrain model.

18. The program product of claim 13, wherein determining the second subset comprises:
  set P=0;
  determine a number of radios, $N_c$, within a radial distance X of a point of the region and in an arc width, Z, whose center line is at an angle Q degrees with respect to a center of the region, where Q=Z*P;
determine that the number of radios is greater than zero;
upon determining that the number of radios is greater than zero, then:
determine a radial distance of a circle, where $$r(\text{in km}) = \begin{cases} d_s & N_c = 1 \\ 2.5 & N_c = 2, \\ d_s * \log_2 N_c & N_c > 2 \end{cases}$$

and
where $d_s$ is an empirically determine constant;
generate the circle having radius r around a centroid of the radios within the radial distance X of the point of the region and in the arc width, Z;
determine points in the region encompassed by the circle;
set P=P+1;
determine that Q is greater than or equal to three hundred and sixty degrees; and
upon determining that Q is greater than or equal to zero, then determining a union of all points determined for each angle, where the subset consists of the union of points.

19. The program product of claim 13, wherein determining the second subset of points comprises:
set P=0;
determine a number of radios, $N_c$, within a radial distance X of a point of the region and in an arc width, Z, whose center line is at an angle Q degrees with respect to a center of the region, where Q=Z*P;
determine that the number of radios equals zero;
set P=P+1;
determine that Q is greater than or equal to three hundred and sixty degrees; and
upon determining that Q is greater than or equal to zero, then determine a union of all points determined for each angle, where the subset consists of the union of points.

20. The program product of claim 9, wherein the certain radios are radios within a radial distance X of a point of the region.

* * * * *